UNITED STATES PATENT OFFICE.

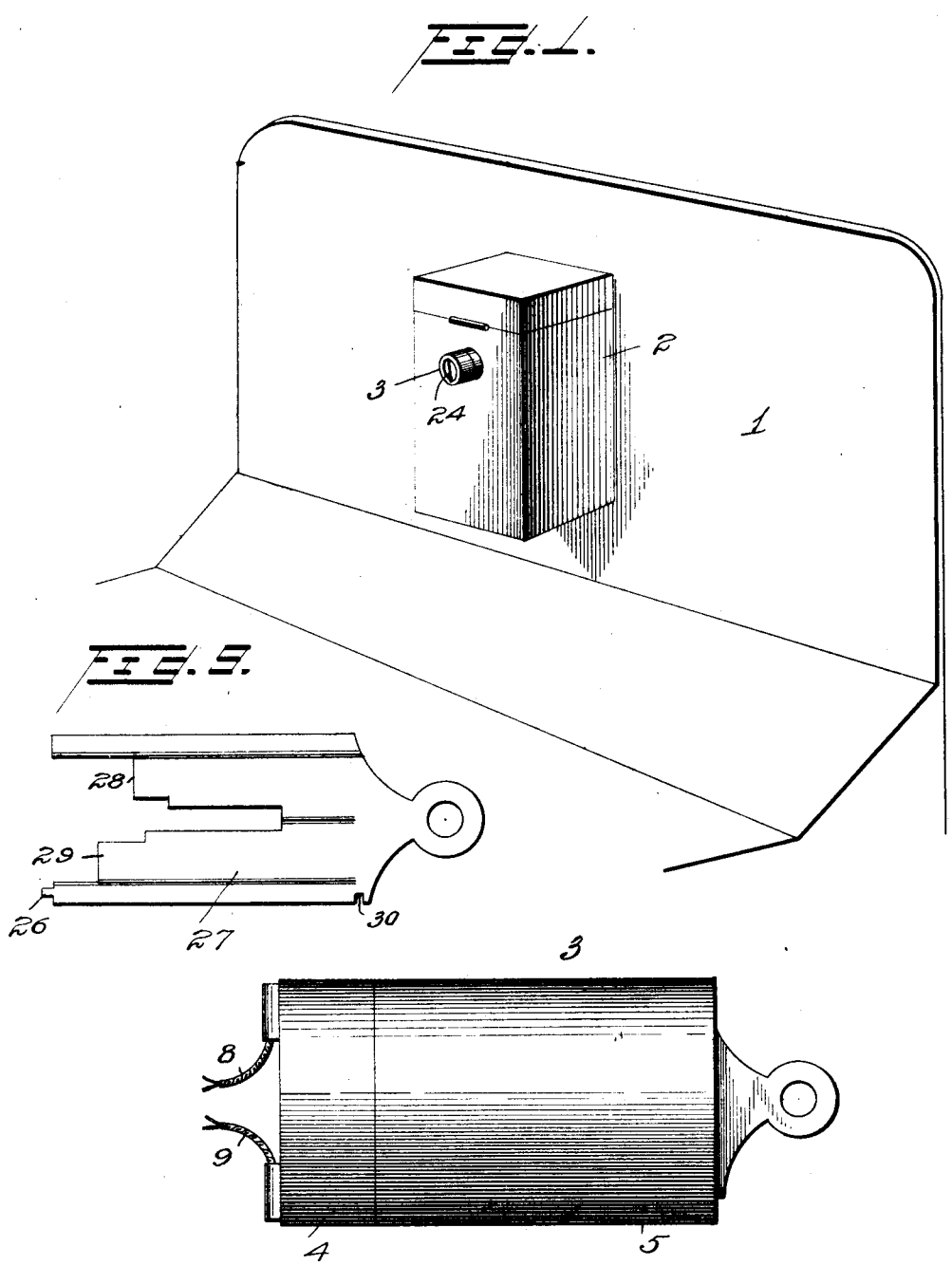

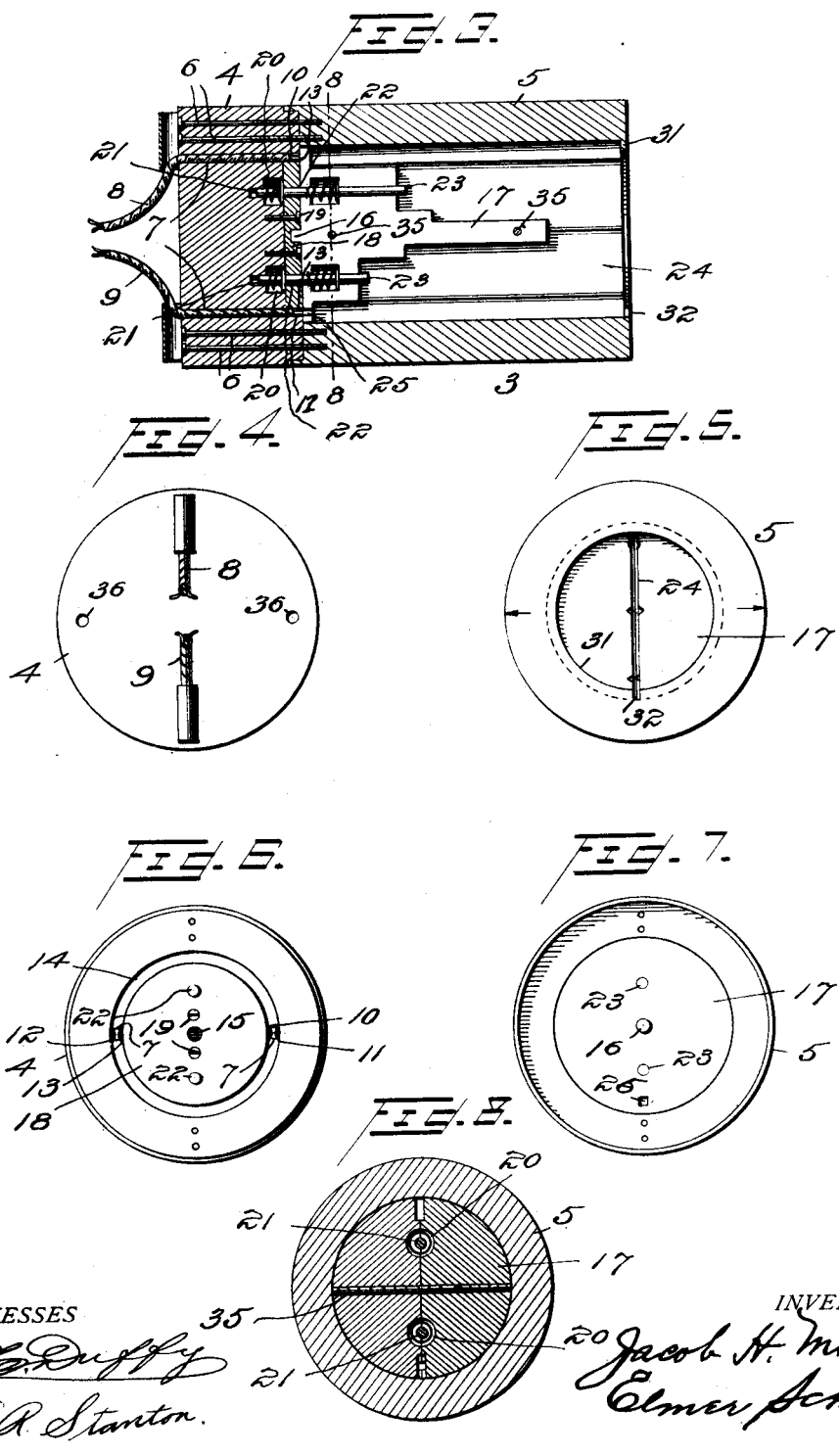

JACOB H. MERTZ AND ELMER SCHATZ, OF WASHINGTON, DISTRICT OF COLUMBIA; SAID MERTZ ASSIGNOR TO SAID SCHATZ.

SAFETY-APPLIANCE LOCK FOR AUTOMOBILES AND THE LIKE.

1,071,169.  Specification of Letters Patent.  Patented Aug. 26, 1913.

Application filed March 11, 1912. Serial No. 682,902.

*To all whom it may concern:*

Be it known that we, JACOB H. MERTZ and ELMER SCHATZ, citizens of the United States of America, residing at Washington, in the District of Columbia, have invented certain new and useful Improvements in Safety-Appliance Locks for Automobiles and the Like, of which the following is a specification.

This invention relates to electric switches for automobiles and the like and is particularly designed to be placed on the coil box or any other convenient position on an automobile or the like for the purpose of switching in or out the battery or magneto circuits of an internal combustion engine.

The invention has for its object to provide an electric switch for the purposes described which is so constructed and arranged that it will act as an efficient lock to prevent the surreptitious moving of an automobile or the like, the switch being so designed that it can be operated only by a key of peculiar design and construction.

With these objects in view, the invention consists of a novel construction and arrangement of the switch and in the combination between the switch and key of peculiar design and construction.

The invention also consists in certain other novel details of construction and in combination of parts all of which will be fully described and afterward pointed out in the claims.

Referring to the accompanying drawings: Figure 1 is a perspective view illustrating the dash board of an automobile or the like and illustrating the coil box in position thereon upon which the switch is mounted; Fig. 2 is a side elevation of the switch constructed in accordance with this invention; Fig. 3 is a vertical longitudinal sectional view through the switch; Fig. 4 is a rear elevation of the switch; Fig. 5 is a front elevation thereof; Fig. 6 is a plan view of the base portion of the switch; Fig. 7 is the plan view of the rotatable member of the switch; Fig. 8 is a vertical sectional view through the switch taken on line 8—8 of Fig. 3, and Fig. 9 is a plan view of the key.

Like reference numerals indicate like parts in the several views, in which the numeral 1 indicates the dash board of an automobile or the like; 2 the coil box thereon and 3 the switch mounted on the coil box, it being, of course, distinctly understood that the position of the switch is entirely immaterial as far as the purposes of this invention is concerned, as the switch 3 may be located secretly in the car or in any convenient position thereon. The switch 3 comprises the base portion 4 and the hollow cylindrical portion 5, said hollow cylindrical portion 5 being secured to the base portion 4 by means of screws 6 or by any other suitable fastening means.

As it will appear from the drawings, the base portion 4 is provided with two perforations 7 through which the electric cables 8 and 9 pass, twin cables being preferably employed, the wires of which twin cables are connected to the spring terminals 10 and 11, and 12 and 13, which as shown in Fig. 6 are arranged in an annular groove 14 in the base portion 4 of the switch, said spring terminals 10, 11, 12 and 13 being arranged in pairs and separated from each in such manner that the circuits are always normally broken, it being understood that the twin cable 8 is in the battery circuit, while the twin cable 9 in the magneto circuit.

Arranged centrally of the base portion 4 of the switch is a circular opening 15 which receives a central boss 16 on the rotatable portion 17 of the switch, said rotatable portion 17 being housed within the cylindrical portion 5 of the switch as is clearly shown in Fig. 3, while upon the base portion 4 of the switch is arranged an annular plate 18 secured in proper position by means of screws or fastenings 19 (Figs. 3 and 6). Disposed in chambers 20 in the base portion 4 of the switch are two spring actuated plungers 21, said spring actuated plungers 21 passing through the annular plate 18 and having their ends normally extend within the openings 22 in the rotatable member 17 of the switch, as clearly appears in Fig. 3. Disposed in the rotatable member 17 of the switch are two spring actuated plungers 23 which register with the spring actuated plungers 21 in the base portion 4 of the switch, said spring actuated plungers 23 having their ends extending within the key slot 24 in the rotatable portion 17 of the switch.

Arranged in the rotatable portion 17 of the switch and near the outer edge thereof, is an opening 25 which receives the point 26 of the key 27, said point 26 extending through the opening 25 and into the annular groove 14 in the base portion 4 of the switch, said point 26 of the key entering said annular groove 14 is in position to enter between the spring terminals 10 and 11, and 12 and 13 in the body portion 4 of the switch in such manner as to close either of the circuits.

Having thus described the several parts of this invention, the operation is as follows: The rotatable member 17 of the switch being provided with a key slot 24 to receive the key 27, it is desired that it be distinctly understood that the form, shape, size and dimensions of the key 27 is entirely immaterial as far as the purposes of this invention is concerned as we consider ourselves clearly entitled to form the key 27 in any desired shape, while the key slot 24 is obviously formed to conform to the shape and contour of the key 27 as will appear from a comparison of the key slot 24 shown in Fig. 3 and the key 27, shown in Fig. 9, the irregular shape of the key being to prevent the insertion of a tool or implement into the key slot in order to operate the switch as will appear by the construction shown and described. The switch is inoperative until the proper key is inserted within the key slot 24 and it is, of course, within the limit and scope of this invention to change or alter the shape and form of the key 27 and key slot 24 for each and every switch in such manner that each individual switch will require a specific form and shape of key.

In order to operate the switch, the key is inserted within the key slot 24, the flat shoulders 28 and 29 on the key 27 engaging the spring actuated plungers 23 at the bottom of the key slot 24 and as said plungers 28 and 29 engage the said plungers, said plungers force the spring actuated plungers 21 out of the holes or perforations 22 within the rotatable member 17 of the switch and by this means disengage the rotatable member 17 from the base portion 4 of the switch in such manner that said rotatable portion 17 is free to be turned by the key 27. However, as the key 27 reaches its limit of inward movement, the point 26 of the key 27 passes through the opening 25 in the rotatable portion of the switch and enters the annular groove 14 in the base portion 4 of the switch and as the key is rotated, the point 26 thereof passes between the spring terminals 10 and 11 or 12 and 13 in order to close either the battery or the magneto circuit, the usual practice being to first close the battery circuit until the engine has started and then to throw in the magneto circuit and break the battery circuit. As long as the key is thus in position, the point 26 being disposed between the spring terminals 10 and 11 or 12 and 13, the switch is operated and a notch 30 is provided near the outer end of the key 27 to receive the annular flange 31 in the cylindrical portion 5 of the switch, said flange 31 being slotted at 32 (Fig. 5) in order to provide for the insertion of the key within the key slot 24 and as long as the key 27 is in operative position within the switch, the said key 27 is held by the annular flange 31, as will be at once apparent from the construction on the accompanying drawings.

Having thus fully described the invention, it is at once apparent that when the key is withdrawn from the switch and the circuit is broken, it is impossible to rotate the rotatable portion 17 of the switch because said rotatable portion 17 and the base portion 4 of the switch are locked together by means of the spring actuated plungers 21, and before said rotatable portion 17 can be rotated, it is necessary and essential that the said plungers 21 be released and forced out of the rotatable member 17, and as it is necessary that said rotatable member 17 be rotated before either of the circuits can be closed, it becomes at once apparent that a switch constructed in accordance with this invention provides an efficient, strong and durable lock either to be used in the ignition circuits of automobiles and the like or in any other electric circuit wherein it is desired to provide a switch which cannot be tampered with and which cannot be operated by a person or persons other than the rightful owner or person authorized thereby. The rotatable portion 17 is preferably constructed in halves and secured together by any suitable means, such as countersunk screws 35, as are here shown. In securing this device to the desired place, we have shown the screw holes 36 for that purpose, but any suitable means may be employed. Mounted on the rear face of the base just over the cable perforations 7 are condulets which have the double function of protecting said cables and effectually concealing the screws 6 which secure the base 4 to the cylindrical portion 5.

We claim:

1. A switch of the character described comprising a stationary body portion, a cylindrical portion, a rotatable portion disposed within said cylindrical portion, means carried in said body portion and entering said rotatable portion to lock the said rotatable portion against movement, said rotatable portion being provided with a key slot to receive the key, and means carried by said rotatable portion and disposed in the path of movement of the key to unlock and disengage the rotatable portion of the switch from the base portion thereof, the said base portion of the switch being provided with terminals of an electric circuit to receive the said key in order to close an electric circuit, as substantially described.

2. A switch of the character described comprising a base portion, a rotatable portion mounted on said base, means in said base portion entering said rotatable portion to lock the said rotatable portion against movement on the said base portion, said rotatable portion being provided with a key slot to receive a key and said rotatable portion being provided with means arranged in the path of movement of the key to disengage and unlock the rotatable portion from the said base portion, the said base portion being provided with terminals of an electric circuit to receive the key when inserted within the key slot in the said rotatable portion, the whole arranged in such manner as to close the electric circuit when said key is inserted between the said terminals substantially as described.

3. A switch of the character described comprising a base portion, a rotatable portion provided with a key slot to receive a key, means disposed in the switch to lock the rotatable portion against movement relatively to the said base portion, means within the switch arranged in the path of movement of the key to unlock and disconnect the rotatable portion of the switch from the base portion, said base portion being provided with terminals of an electric circuit to receive a key inserted within the key slot of the rotatable portion, substantially as described.

In testimony whereof we affix our signatures in presence of two witnesses.

JACOB H. MERTZ.
ELMER SCHATZ.

Witnesses:
GEO. S. LIVINGSTON,
E. C. DUFFY.

---

Copies of this patent may be obtained for five cents each, by addressing the "Commissioner of Patents, Washington, D. C."